US012494901B2

(12) United States Patent
Andrews et al.

(10) Patent No.: US 12,494,901 B2
(45) Date of Patent: Dec. 9, 2025

(54) ISSUING SURROGATE CREDENTIALS FOR ACCESSING TARGET RESOURCES

(71) Applicant: Oracle International Corporation, Redwood Shores, CA (US)

(72) Inventors: Thomas James Andrews, Seattle, WA (US); Girish Nagaraja, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 199 days.

(21) Appl. No.: 18/410,231

(22) Filed: Jan. 11, 2024

(65) Prior Publication Data

US 2025/0233744 A1 Jul. 17, 2025

(51) Int. Cl.
*H04L 9/08* (2006.01)
(52) U.S. Cl.
CPC ................... *H04L 9/0825* (2013.01)
(58) Field of Classification Search
None
See application file for complete search history.

(56) References Cited

U.S. PATENT DOCUMENTS

| | | |
|---|---|---|
| 9,092,502 B1 | 7/2015 | Cannaliato et al. |
| 9,164,864 B1 | 10/2015 | Novick et al. |
| 9,306,814 B1 | 4/2016 | Roth et al. |
| 9,438,599 B1 | 9/2016 | Yuhan et al. |
| 9,722,895 B1 | 8/2017 | Sarukkai et al. |
| 9,985,947 B1 * | 5/2018 | Elhard .................... H04L 63/08 |
| 10,394,638 B1 | 8/2019 | Lay et al. |
| 10,649,834 B2 | 5/2020 | Dhayapule et al. |

(Continued)

FOREIGN PATENT DOCUMENTS

| | | |
|---|---|---|
| EP | 2893685 B1 | 7/2017 |
| EP | 3429156 A1 | 1/2019 |

(Continued)

OTHER PUBLICATIONS

Anonymous: "Oracle Cloud Infrastructure Documentation—Security Guide for Exadata Database Service on Cloud@Customer Systems", Apr. 1, 2023, XP093181902.

(Continued)

*Primary Examiner* — Benjamin E Lanier
(74) *Attorney, Agent, or Firm* — Invoke

(57) ABSTRACT

A system grants access for a computing entity to execute a requested operation upon a target resource based on a set of one or more access policies associated with a different computing entity. The access control service receives a surrogate access request from a first computing entity. The surrogate access request represents a request for the first computing entity to execute a requested operation upon a target resource based on a set of one or more access policies corresponding to a principal associated with a second computing entity. The system obtains a set of one or more access policies respectively, including a set of one or more authorized operations associated with the principal, and determines whether the requested operation corresponds to at least one authorized operation. Responsive to determining that the requested operation corresponds to at least one authorized operation, the system authorizes execution of the requested operation.

20 Claims, 10 Drawing Sheets

(56) References Cited

U.S. PATENT DOCUMENTS

| | | | |
|---|---|---|---|
| 10,757,574 B1* | 8/2020 | Rule | H04L 9/3228 |
| 10,878,483 B1 | 12/2020 | Felbinger et al. | |
| 10,992,540 B1 | 4/2021 | Kandaswamy et al. | |
| 11,356,273 B1 | 6/2022 | Patel et al. | |
| 11,720,536 B1 | 8/2023 | Kisser et al. | |
| 2002/0198973 A1 | 12/2002 | Besaw | |
| 2003/0154407 A1* | 8/2003 | Kato | H04L 63/0492 726/5 |
| 2006/0230281 A1 | 10/2006 | Hofmann | |
| 2007/0179859 A1 | 8/2007 | Chan et al. | |
| 2008/0295095 A1 | 11/2008 | Watanabe et al. | |
| 2010/0212004 A1* | 8/2010 | Fu | G06F 21/6218 726/9 |
| 2011/0055399 A1 | 3/2011 | Tung et al. | |
| 2013/0054426 A1 | 2/2013 | Rowland et al. | |
| 2013/0297711 A1 | 11/2013 | Nhu | |
| 2013/0297802 A1 | 11/2013 | Laribi et al. | |
| 2013/0304925 A1 | 11/2013 | Ferris et al. | |
| 2014/0156846 A1 | 6/2014 | Stern et al. | |
| 2014/0280595 A1 | 9/2014 | Mani et al. | |
| 2015/0200824 A1 | 7/2015 | Sadovsky et al. | |
| 2015/0350101 A1 | 12/2015 | Sinha et al. | |
| 2015/0363852 A1 | 12/2015 | Vautour | |
| 2016/0043909 A1 | 2/2016 | Pogrebinsky et al. | |
| 2016/0080479 A1 | 3/2016 | Zhang et al. | |
| 2016/0142211 A1* | 5/2016 | Metke | H04L 63/0823 713/175 |
| 2016/0203533 A1 | 7/2016 | Cheng et al. | |
| 2016/0277411 A1 | 9/2016 | Dani et al. | |
| 2017/0230229 A1 | 8/2017 | Sasturkar et al. | |
| 2018/0052861 A1 | 2/2018 | Seetharaman et al. | |
| 2018/0173510 A1 | 6/2018 | Koshkin et al. | |
| 2018/0219784 A1 | 8/2018 | Jiang et al. | |
| 2018/0234256 A1* | 8/2018 | Bowen | H04L 63/0823 |
| 2018/0288063 A1 | 10/2018 | Koottayi et al. | |
| 2018/0367542 A1 | 12/2018 | Wolf et al. | |
| 2019/0036797 A1 | 1/2019 | Margalit et al. | |
| 2019/0087835 A1 | 3/2019 | Schwed et al. | |
| 2019/0155674 A1 | 5/2019 | Dhayapule et al. | |
| 2019/0156000 A1 | 5/2019 | Hoffmann et al. | |
| 2019/0166007 A1 | 5/2019 | Sundaram et al. | |
| 2019/0213104 A1 | 7/2019 | Qadri et al. | |
| 2019/0349426 A1 | 11/2019 | Smith et al. | |
| 2020/0014659 A1 | 1/2020 | Chasman et al. | |
| 2020/0112497 A1 | 4/2020 | Yenumulapalli et al. | |
| 2020/0117757 A1 | 4/2020 | Yanamandra et al. | |
| 2020/0134223 A1 | 4/2020 | Ye et al. | |
| 2020/0236096 A1 | 7/2020 | Zhu et al. | |
| 2020/0285496 A1 | 9/2020 | Cropper et al. | |
| 2020/0285737 A1 | 9/2020 | Kraus et al. | |
| 2020/0358617 A1 | 11/2020 | Baierlein et al. | |
| 2020/0358756 A1 | 11/2020 | Rose et al. | |
| 2021/0144440 A1 | 5/2021 | Li et al. | |
| 2021/0216190 A1 | 7/2021 | Vakil et al. | |
| 2021/0234864 A1 | 7/2021 | Dube et al. | |
| 2021/0273914 A1* | 9/2021 | Cobb | H04L 63/0435 |
| 2021/0279109 A1 | 9/2021 | Ji et al. | |
| 2021/0377272 A1 | 12/2021 | Dasari et al. | |
| 2021/0392142 A1 | 12/2021 | Stephens et al. | |
| 2022/0091947 A1 | 3/2022 | Kothari et al. | |
| 2022/0103618 A1 | 3/2022 | Pinheiro et al. | |
| 2022/0150124 A1 | 5/2022 | Cooley et al. | |
| 2022/0255902 A1 | 8/2022 | Woodson | |
| 2022/0294818 A1 | 9/2022 | Parekh et al. | |
| 2022/0335340 A1 | 10/2022 | Moustafa et al. | |
| 2022/0374271 A1 | 11/2022 | Pogrebinsky et al. | |
| 2023/0032585 A1 | 2/2023 | Jeuk et al. | |
| 2023/0109926 A1 | 4/2023 | Nair et al. | |
| 2023/0126757 A1 | 4/2023 | Roy et al. | |
| 2023/0179525 A1 | 6/2023 | Pai et al. | |
| 2023/0281100 A1 | 9/2023 | Wells et al. | |
| 2023/0316348 A1 | 10/2023 | Dageville et al. | |
| 2023/0342179 A1 | 10/2023 | Suttle et al. | |
| 2023/0362161 A1 | 11/2023 | Spector et al. | |
| 2023/0385286 A1 | 11/2023 | Glickman et al. | |
| 2024/0054063 A1 | 2/2024 | Wichelman et al. | |
| 2024/0095739 A1 | 3/2024 | Adogla et al. | |
| 2024/0160517 A1 | 5/2024 | Fischer et al. | |
| 2024/0259389 A1 | 8/2024 | Wu et al. | |
| 2024/0320240 A1 | 9/2024 | Podder | |
| 2024/0386054 A1 | 11/2024 | Wouhaybi et al. | |

FOREIGN PATENT DOCUMENTS

| | | | | |
|---|---|---|---|---|
| EP | 3271857 B1 | 4/2020 | | |
| WO | 2014/039921 A1 | 3/2014 | | |
| WO | WO-2018010791 A1 * | 1/2018 | | G06F 21/44 |
| WO | 2021/150306 A1 | 7/2021 | | |
| WO | 2021/150307 A1 | 7/2021 | | |
| WO | WO-2021145894 A1 * | 7/2021 | | H04L 67/1034 |
| WO | 2021/174104 A1 | 9/2021 | | |

OTHER PUBLICATIONS

Anonymous: "Oracle Cloud Infrastructure Documentation—Overview of IAM", Feb. 8, 2023, XP093184083.
Anonymous: "Oracle Cloud Infrastructure Documentation—Renaming a Cloud Account", May 14, 2021, XP093185071.
Anonymous: "Oracle Cloud Infrastructure Documentation—Site-to-Site VPN Overview", Feb. 8, 2023, XP093184733.
Anonymous: "Oracle Cloud Infrastructure Documentation—Billing and cost management overview", Dec. 20, 2022, XP093183514.
Anonymous: "Oracle Cloud Infrastructure Documentation—Cloud Guard concepts", Jan. 18, 2022, XP093183028.
Anonymous: "Oracle Cloud Infrastructure Documentation—Getting Started with Policies", Jan. 4, 2023, XP093184099.
Anonymous: "Oracle Cloud Infrastructure Documentation—Getting Summary Information on the Overview Page", Aug. 16, 2022, XP093183031.
Anonymous: "Oracle Cloud Infrastructure Documentation—Learn Best Practices for Set ting Up Your Tenancy", Feb. 8, 2023, XP093184095.
Anonymous: "Oracle Cloud Infrastructure Documentation—Managing Compartments", Feb. 8, 2023, XP093184098.
Anonymous: "Oracle Cloud Infrastructure Documentation—Monitoring Threats", Sep. 28, 2022, XP093183035.
Anonymous: "Oracle Cloud Infrastructure Documentation—Overview of the Console Dashboards Service", Mar. 14, 2023, XP093184740.
Anonymous: "Oracle Cloud Infrastructure Documentation—Prerequisites for Oracle Platform Services on Oracle Cloud Infrastructure", Mar. 23, 2023, XP093185058.
Anonymous: "Oracle Cloud Infrastructure Documentation—Welcome to Oracle Cloud Infrastructure", Mar. 23, 2023, XP093182493.
Anonymous: "Oracle Gen 2 Exadata Cloud@Customer Security Controls", Jan. 11, 2023, XP093181973.
Anonymous: "Oracle Operator Access Control Configuration and Administration Guide", Nov. 18, 2022, XP093181896.
Anonymous: "Oracle Public Sector Licensing and Permitting", 2022, XP093184298.
Anonymous: "Oracle Sovereign Cloud", Feb. 15, 2023, XP093184649.
Apps2fusion: "Security Roles in Oracle Fusion Cloud SLA", Nov. 30, 2018, XP093184293.
Magouryrk Clay: "Announcing Oracle Alloy: The power of the cloud in your hands", Oct. 18, 2022, XP093183485.
Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).
"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.
"Overview of Access Approval", Retrieved from https://cloud.google.com/assured-workloads/access-approval/docs/overview, Jun. 6, 2024, pp. 5.

(56) References Cited

OTHER PUBLICATIONS

"Reinstate admin privileges for a customer's Azure CSP subscriptions", Retrieved from https://learn.microsoft.com/en-us/partner-center/reinstate-csp, Aug. 1, 2023, pp. 7.

"Tenant administrator settings", Retrieved from https://backstage.forgerock.com/docs/idcloud/latest/tenants/tenant-administrator-settings.html, Jun. 7, 2023, pp. 12.

Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.

Ducharme et al., "Seamlessly Protect Your IBM Cloud Application Infrastructure with Privileged Access Gateway", Oct. 3, 2022, pp. 13.

"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.

"IBM SmartCloud: Becoming a Cloud Service Provider", IBM, Dec. 13, 2012, <https://www.redbooks.ibm.com/abstracts/redp4912.html> (Year: 2012).

"Overview of Search", Oracle Cloud Infrastructure Documentation, May 13, 2024, pp. 15.

"Overview of Tagging", Oracle Cloud Infrastructure Documentation, Mar. 28, 2024, pp. 12.

Anonymbus: "Tokenization—(data security)", Wikipedia, Feb. 12, 2023, pp. 1-12.

George et al., "Data anonymization and integrity checking in cloud computing", 2013 Fourth International Conference on Computing, Communications and Networking Technologies (ICCCNT), Jul. 2013, pp. 5.

Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.

Soldani et al., "Anomaly Detection and Failure Root Cause Analysis in (Micro)Service-Based Cloud Applications: A Survey", ACM Computing Surveys, vol. 55, No. 3, Article 59, Feb. 2022, pp. 1-39.

F. John Krautheim ; Private Virtual Infrastructure for Cloud Computing; USENIX:2009; pp. 1-5.

"General Variables for All Requests", Jun. 28, 2023, pp. 6.

"Policy Syntax", Jan. 4, 2023, pp. 7.

"Verbs", Jun. 5, 2023, pp. 2.

* cited by examiner

ISSUING SURROGATE CREDENTIALS FOR ACCESSING TARGET RESOURCES

TECHNICAL FIELD

The present disclosure relates to accessing target resources on cloud computing networks. More particularly, the present disclosure relates to issuing credentials that can be used by a recipient to access the target resources.

BACKGROUND

Access to target resources on a cloud computing network may be based at least in part on one or more access policies that are managed by an authorization system such as an identity access management (IAM) system. The principal presents a credential along with a requested action to be performed with respect to the target resource. The credential associates the principal with an identity in the authorization system. The authorization system includes one or more access policies associated with the identity of the principal. The one or more access policies may define permissions or actions that are allowed or denied, for example, with respect to the target resource itself or a compartment where the target resource is located. If the one or more access policies include a permission that encompasses the requested action, the principal is granted access to the target resource, enabling the principal to perform the requested action. If the permissions in the one or more access policies do not encompass the requested action, access is denied, and the requested action rejected, thereby ensuring that actions performed with respect to the target resource align with the permissions defined by the access policies.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment, and they mean at least one. In the drawings.

DETAILED DESCRIPTION

Figure 1:
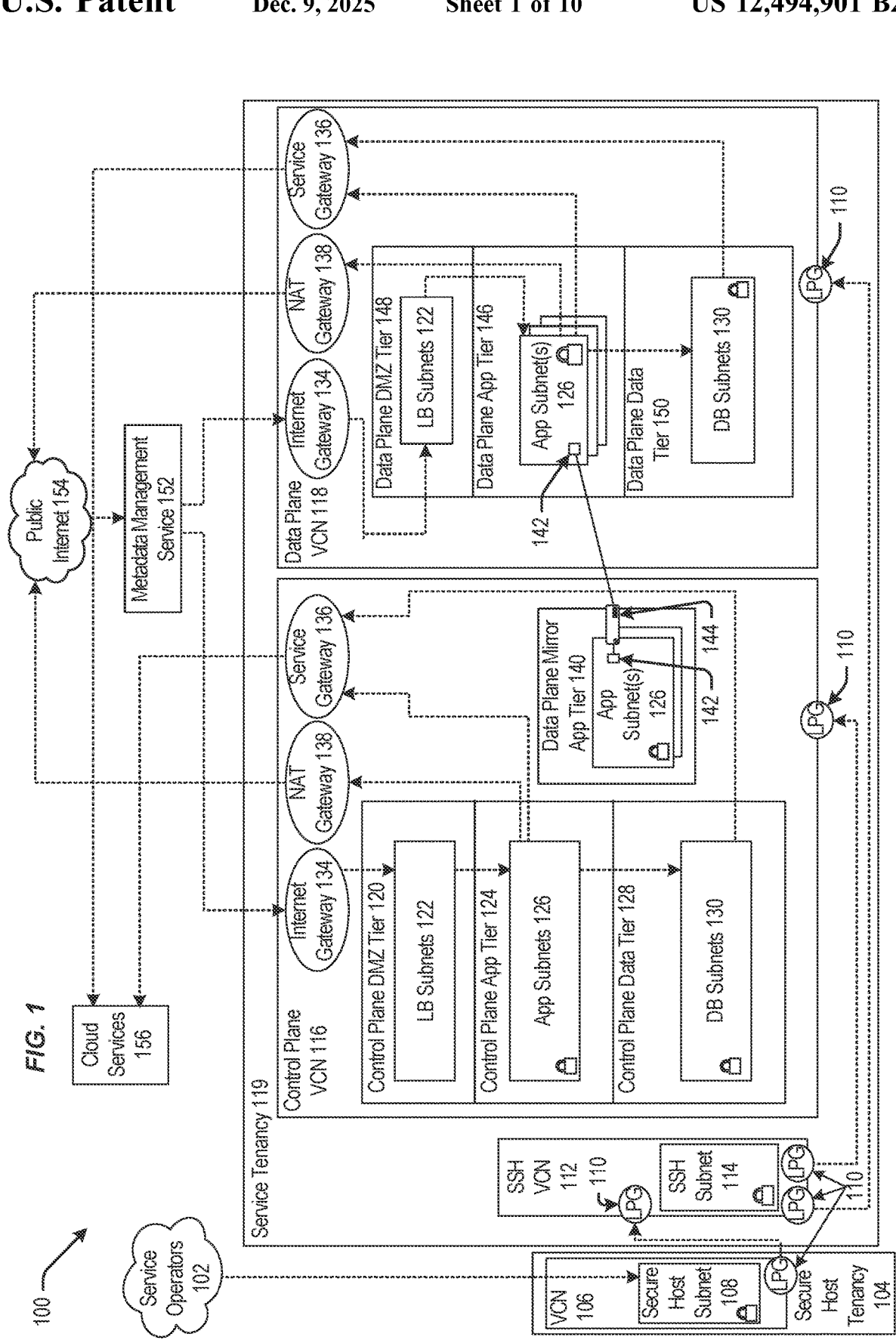
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. DEFINITIONS
3. CLOUD COMPUTING TECHNOLOGY
4. COMPUTER SYSTEM
5. ARCHITECTURAL OVERVIEW
6. EXAMPLE OPERATIONS
7. MISCELLANEOUS; EXTENSIONS

1. GENERAL OVERVIEW

An access control service grants access for a computing entity to execute one or more operations upon a target resource based on a set of one or more access policies associated with a different computing entity. The access control service receives a surrogate access request from a first computing entity. The surrogate access request represents a request from the first computing entity for the access control service to execute a requested operation upon a target resource based on the set of one or more access policies corresponding to a principal associated with a second computing entity. The surrogate access request includes a surrogate token that identifies the requested operation as well as a principal token that identifies a principal associated with the second computing entity. The principal identified by the principal token represents an identity of the second computing entity in an authorization system. The access control service obtains the set of one or more access policies from the authorization system. Each access policy includes a set of one or more authorized operations associated with the principal corresponding to the second computing entity. The access control service determines, based at least in part on the set of one or more access policies, that the requested operation corresponds to an authorized operation of the set of one or more authorized operations corresponding to the set of one or more access policies. Responsive to determining that the requested operation corresponds to the authorized operation, the access control service authorizes execution of the requested operation upon the target resource in accordance with the set of one or more access policies. Upon authorizing the requested operation, the access control service may execute the requested operation. Additionally, or alternatively, the access control service may transmit an indication to the first computing entity that the requested operation is authorized, and the first computing entity may execute the requested operation.

Surrogate tokens may be generated by computing entities without utilizing resources of the authorization system. In one example, a first computing entity may generate a surrogate token for use in a surrogate access request. The first computing entity may transmit the surrogate token to the second computing entity, and the second computing entity may digitally sign the surrogate token. The digital signature of the second computing entity may indicate that the second computing entity has authorized the first computing entity to execute the requested operation or cause the access control service to execute the requested operation. The second computing entity may transmit the digitally signed surrogate token to the first computing entity along with a principal token that identifies a principal associated with the second computing entity in the authorization system. The first computing entity may digitally sign the surrogate access request and may transmit the surrogate access request to the access control service.

The access control service may authenticate the surrogate access request by validating the digital signature of the first computing entity using a first public key associated with the first computing entity. The first public key may be included in the surrogate token. The access control service may authenticate the surrogate token by validating the digital signature of the second computing entity using a second public key associated with the second computing entity. The second public key may be included in the principal token. The access control service may authenticate the principal token by validating a digital signature of the authorization system included in the principal token. The digital signature of the authorization system may be validated using a public key of the authorization system. The public key may be included in the principal token or otherwise available to the access control service.

Various computing entities may utilize surrogate access requests to obtain authorization to execute operations upon target resources based on access policies associated with a different computing entity. Thus, separate access policies for the various computing entities do not need to be generated in the authorization system. In one example, access policies in the authorization system may be associated with a tenant, a compartment, or a resource of a virtual cloud network. In one example, a computing entity that holds a surrogate token may be associated with customers of cloud services, and the requested operations may be executed based on a set of one or more access policies associated with the tenant, the compartment, or the resource. Additionally, or alternatively, a computing entity that holds a surrogate token may be associated with a first tenant, compartment, or resource on the virtual cloud network, and the requested operations may be executed based on a set of one or more access policies associated with a second tenant, compartment, or resource on the virtual cloud network.

In one example, a first computing entity may execute, or may cause an access control service to execute, a first requested operation with respect to a first target resource based on a first access policy corresponding to a first principal associated with a second computing entity. The first computing entity may be authorized to perform operations with respect to a first portion of the virtual cloud network, but operations associated with the first target resource may be unauthorized by the access policies associated with the first computing entity. Thus, the first computing entity may obtain authorization for the first requested operation from the second computing, with the second computing entity being authorized to perform the first requested operation with respect to the first target resource based on the first access policy. Additionally, or alternatively, the second computing entity may execute, or may cause an access control service to execute, a second requested operation with respect to a second target resource based on a second access policy corresponding to a second principal associated with the first computing entity. The second computing entity may be authorized to perform operations with respect a second portion of the virtual cloud network, but operations associated with the second target resource may be unauthorized by the access policies associated with the second computing entity. Thus, the second computing entity may obtain authorization for the second requested operation from the first computing entity with the first computing entity being authorized to perform the second requested operation with respect to the second target resource based on the second access policy.

One or more embodiments described in this Specification and/or recited in the claims may not be included in this General Overview section.

2. DEFINITIONS

As used herein, the term "principal" refers to an identity of an entity that interacts with and accesses cloud resources or services. A principal may be utilized by an authorization system, such as an IAM system, to uniquely identify and/or authenticate the identity of the entity represented by the principal. The identity represented by the principal may include at least one of the following: an identity associated with a user using a computing device, an identity associated with a computing device, or an identity associated with a resource executing or instantiated on a computing device. The principal may be associated with one or more access policies that define what actions associated with the principal are to be allowed or denied by the authorization system. As examples, the entity associated with a principal may include a user, a device, a resource, or a service. A principal may include a user principal, a service principal, a device principal, a role principal, or a group principal. A user principal may represent an identity of an individual user. A user principal may be associated with a customer, a tenant, a cloud provider, or a cloud operator. A resource principal may represent an identity of a computing entity or resource. A service principal may represent an identity of an application or a service. A device principal may represent an identity of a particular computing device. A role principal may represent an identity of a specific role or set of responsibilities within an organization or system. A group principal may represent an identity of a group of users or other principals. A group principal may be used to uniquely identify and/or authenticate the group. A group principal may be used to simplify access control by providing access control policies that are to be applied to a group of users or other principles rather than individual users or other principals.

As used herein, the term "access policy" refers to a set of one or more rules, permissions, or configurations that define what actions are allowed or denied for a particular principal with respect to particular resources within a computing network such as a virtual cloud network. An access policy may be managed by an authorization system. The authorization system may include one or more access policies associated with a particular principal. Additionally, or alternatively, the authorization system may include one or more access policies corresponding to a particular resource. An access policy may be associated with one or more compartments of a virtual cloud network. Additionally, or alternatively, an access policy may be associated with one or more logical containers of a particular compartment.

As used herein, the term "compartment" refers to a set of one or more logical containers utilized to organize and segregate resources, services, and/or permissions of a cloud computing environment.

As used herein, the term "logical container" refers to a virtual structure used to organize and manage cloud resources, services, or data.

As used herein, the term "target resource" refers to a cloud resource that may be accessed based on one or more access policies in an authorization system. As examples, a target resource may include one or more of the following: a computing entity, a virtual machine, a database, a service, a data storage resource, a container, a compartment, or a networking resource.

As used herein, the term "tenant" refers to an entity that receives cloud computing services provided by a cloud provider.

As used herein, the term "cloud provider" or "service provider" refers to a provider of cloud computing services, such as an Infrastructure as a Service and/or one or more target services located on a cloud provider infrastructure.

As used herein, the term "cloud operator" refers to an entity that maintains cloud infrastructure. A cloud operator may perform services on behalf of a cloud provider, such as provisioning, configuring, troubleshooting, debugging, maintaining, or managing cloud resources and related infrastructure. A cloud operator and a cloud provider may be different entities or the same entities.

As used herein, the term "customer" may refer to a tenant or an entity that receives services from a tenant.

As used herein, the term "on-premises network" refers to a network infrastructure or device that is located and operated within a physical premises or data center of a tenant.

As used herein, the term "multi-cloud environment" refers to a cloud computing strategy that integrates services and resources from multiple cloud providers. In a multi-cloud environment, an organization may simultaneously utilize the infrastructure, platform, or software services of two or more cloud providers rather than relying on a single cloud provider. Additionally, or alternatively, in a multi-cloud environment, a first cloud provider may be a customer or a client with respect to a second cloud provider.

As used herein, the term "computing entity" refers to a device, component, or element within a computer network and/or cloud infrastructure. A computing entity may be implemented in hardware and/or software.

As used herein, the term "asymmetric key pair" refers to both a public key and a private key that are associated with one another such that a digital signature or an encryption generated using the private key may be validated or decrypted using the public key.

As used herein, the term "token" refers to a data element that serves as proof of an identity. A token may have an expiration and may have a short period when the token may be utilized. In one example, a token may have a time-based expiry such that the token expires after a period of time. Additionally, or alternatively, a token may have a session-based expiry such that the token expires when a session is terminated. In one example, a token may conform to an OAuth 2.0 protocol.

As used herein, the term "session" refers to a set of one or more data transmissions to or from a computing entity occurring during a validity period for an authentication of an identity associated with the computing entity. A session may include an open socket session or a closed socket session. A session may include a VPN (Virtual Private Network) session, a VPC (Virtual Private Cloud) session, a VLAN (Virtual LAN) session, a cloud API session, an application gateway session, a direct connection session, a BGP (Border Gateway Protocol) session, a load balancer session, a container orchestration session, a SDN (software-Defined Networking) session, a firewall session, a NAT (Network Address Translation) session, an HTTP session, a Telnet session, an SSH (Secure Shell) session, an FTP session, a database session, an API session, a Web session, a video session, a VoIP session, a virtual machine session, a streaming media session, or an online gaming session.

3. CLOUD COMPUTING TECHNOLOGY

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment, such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on one another, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
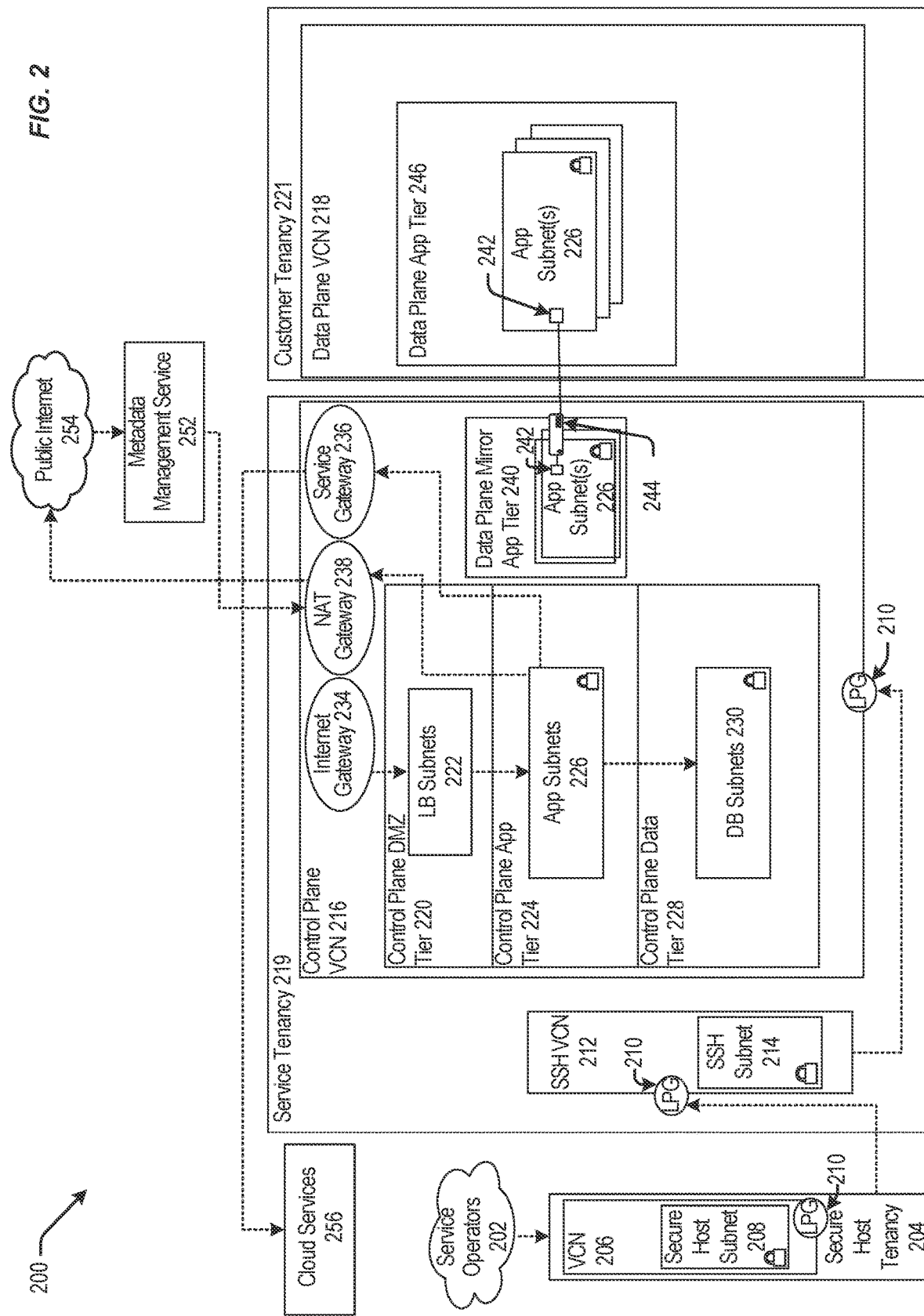

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique compute instance 244 that is contained in the service tenancy 219. Each compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
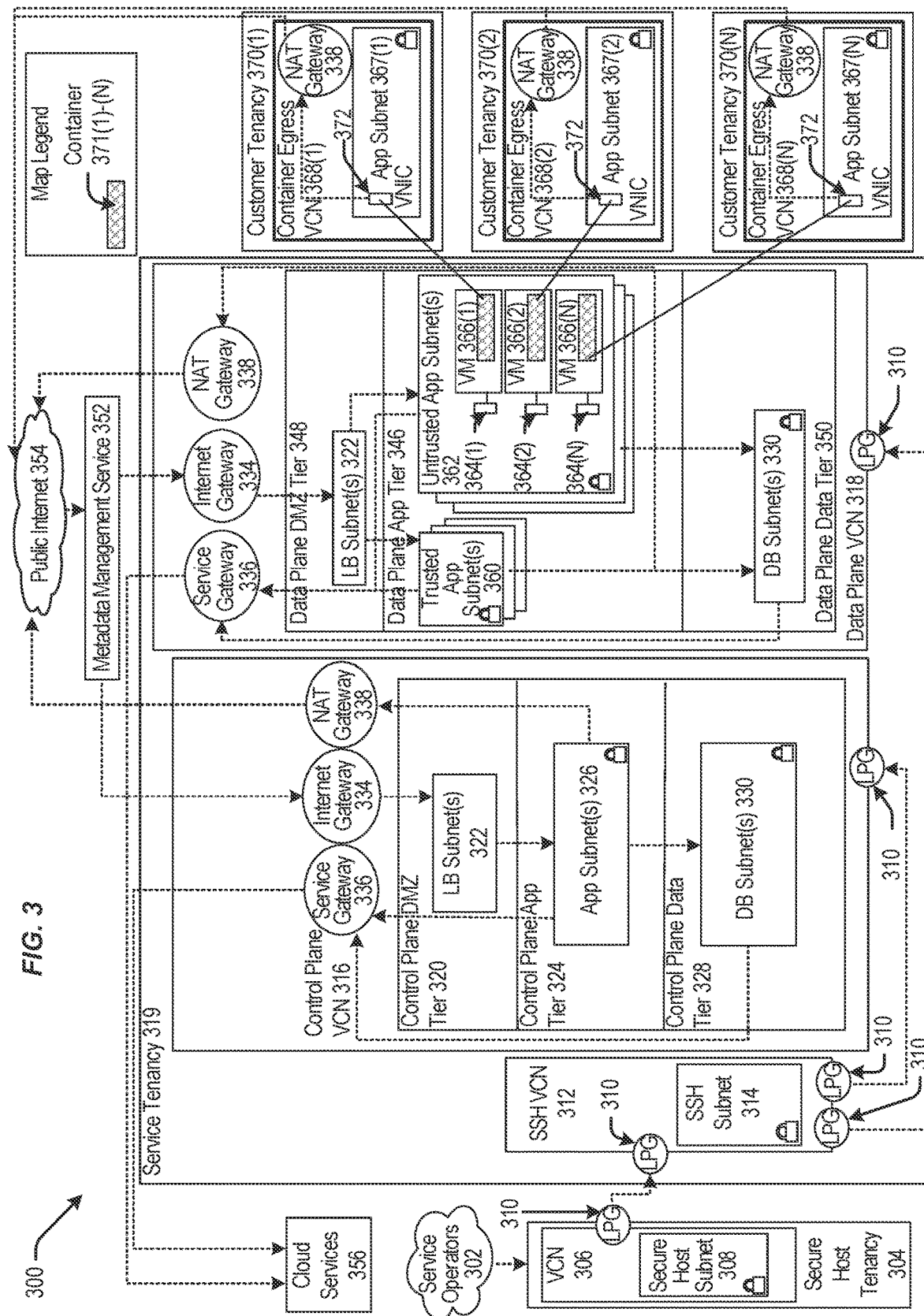

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
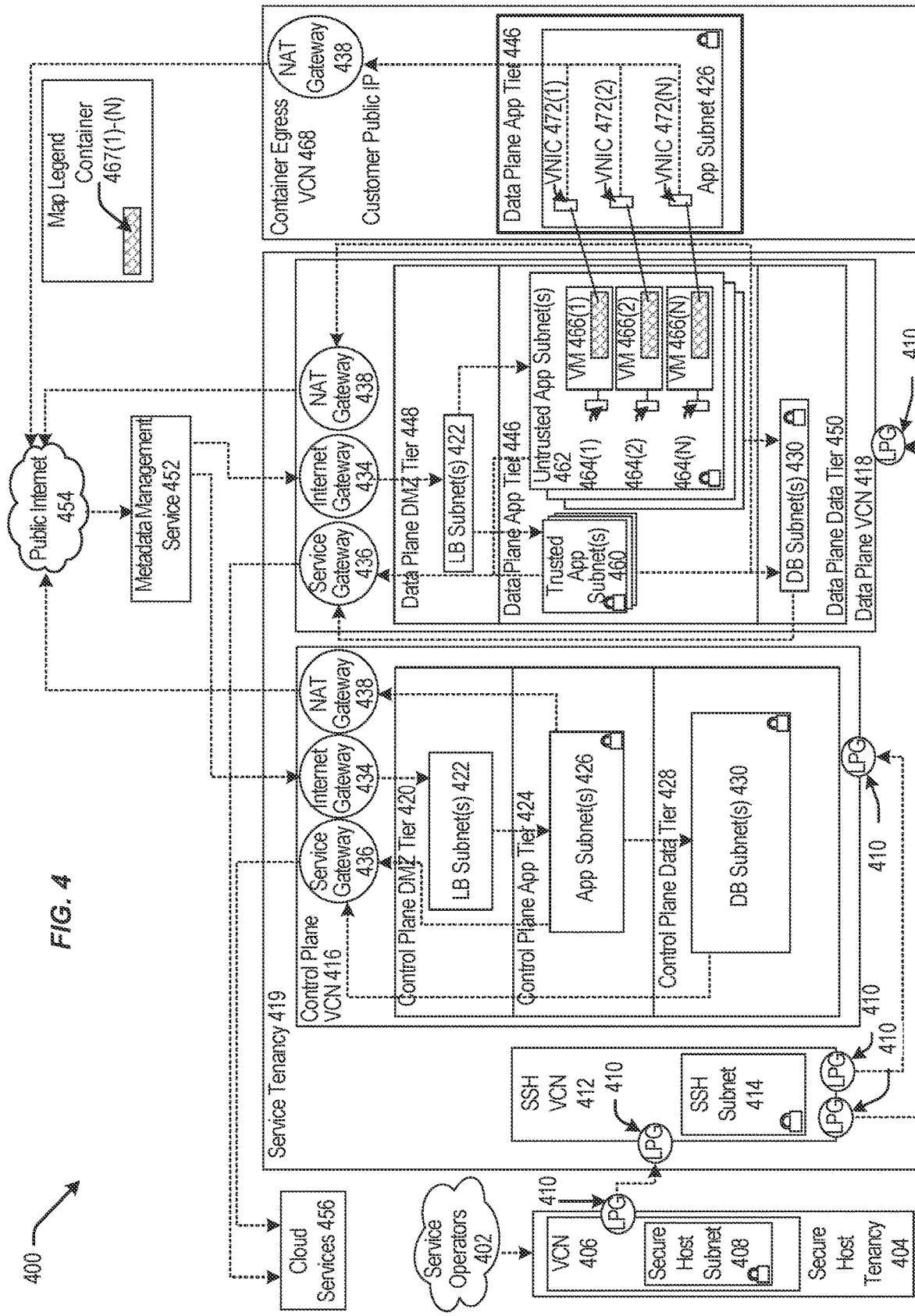

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICS 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by: a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for each tenant, a set of applications that the tenant is authorized to access. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

4. COMPUTER SYSTEM

Figure 5:
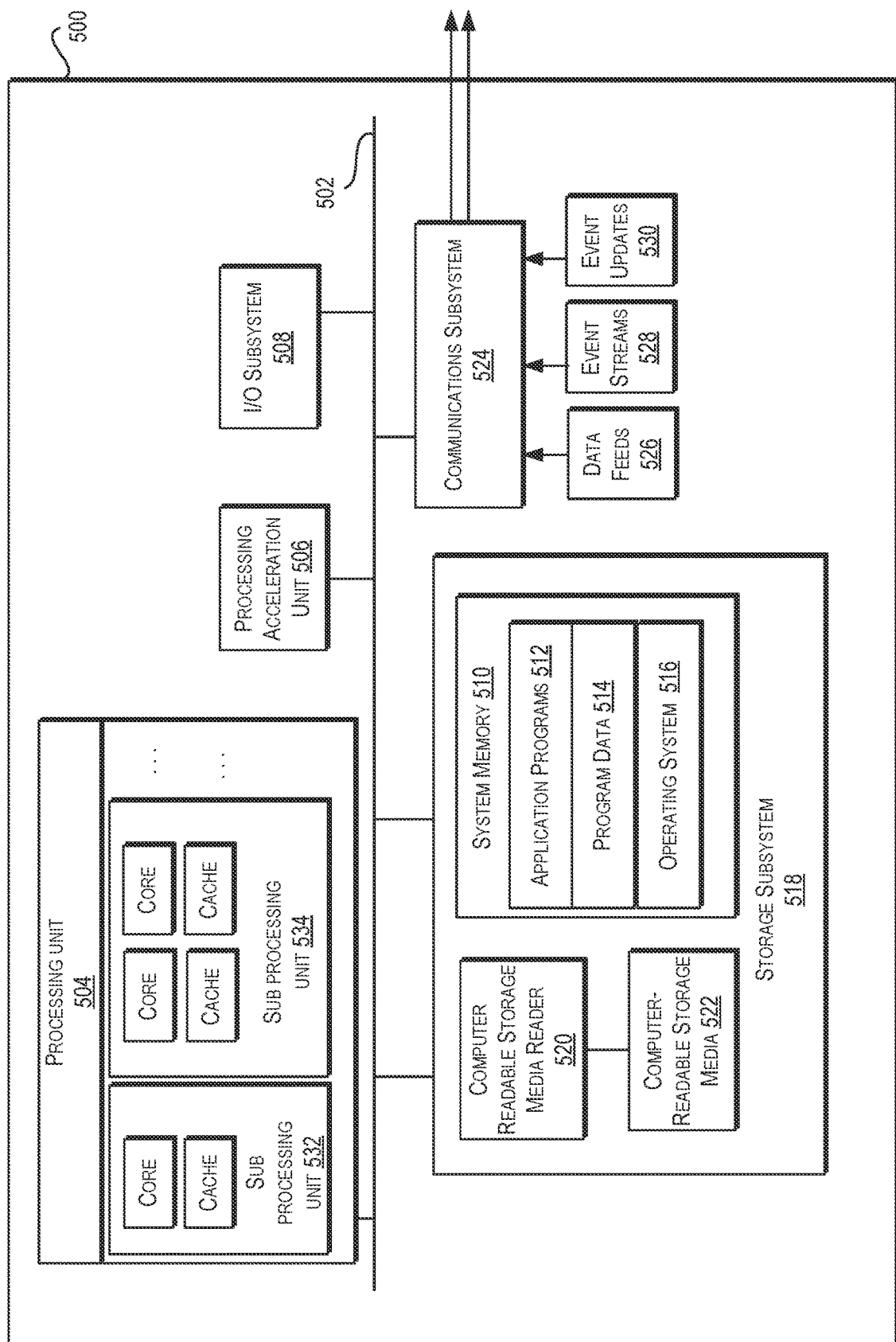
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with each other as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics and audio/video information, such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided, including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), click-stream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

5. ARCHITECTURAL OVERVIEW

Figure 6A:
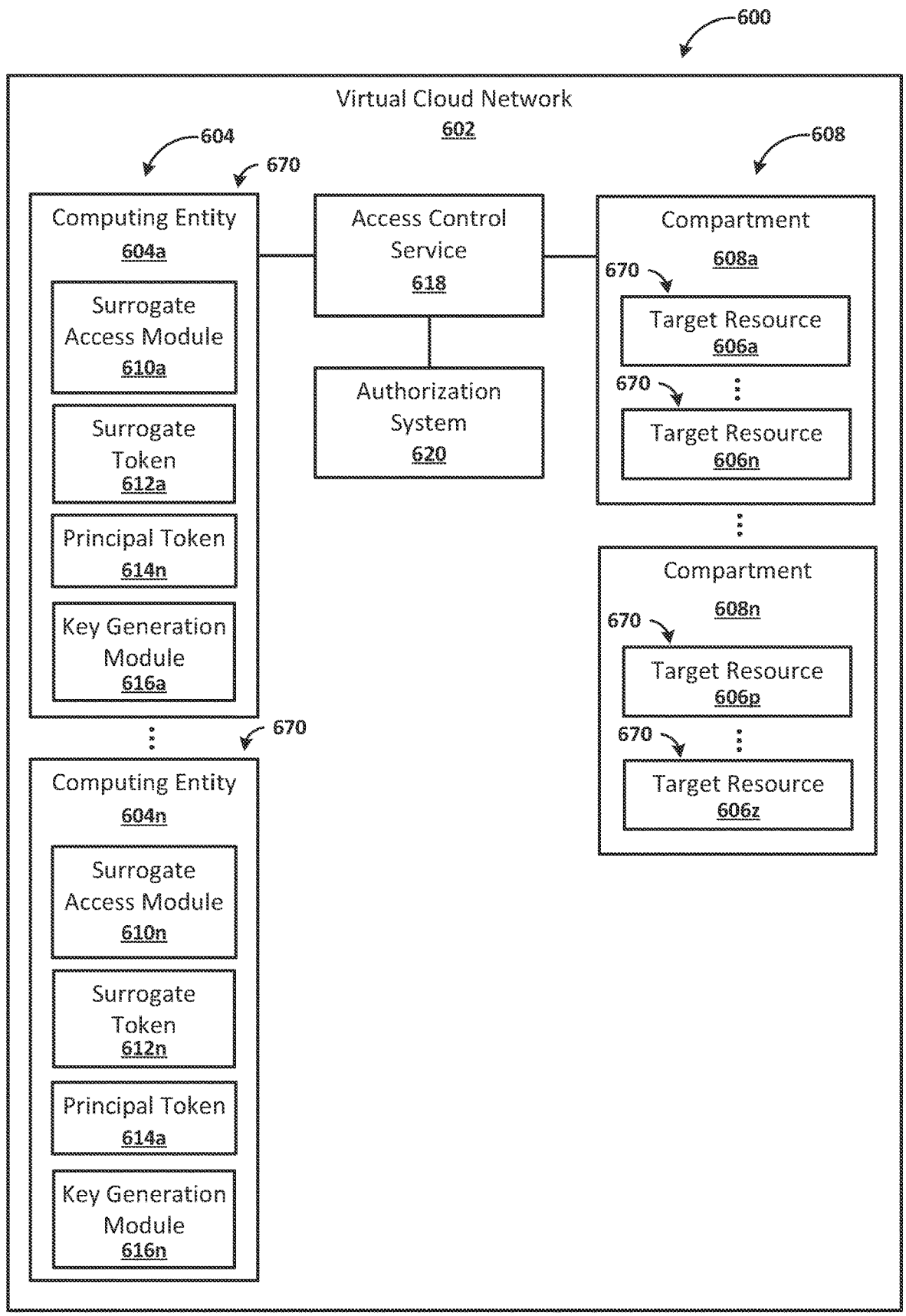
FIGS. 6A and 6B illustrate features of an example system in accordance with one or more embodiments.
Figure 6B:
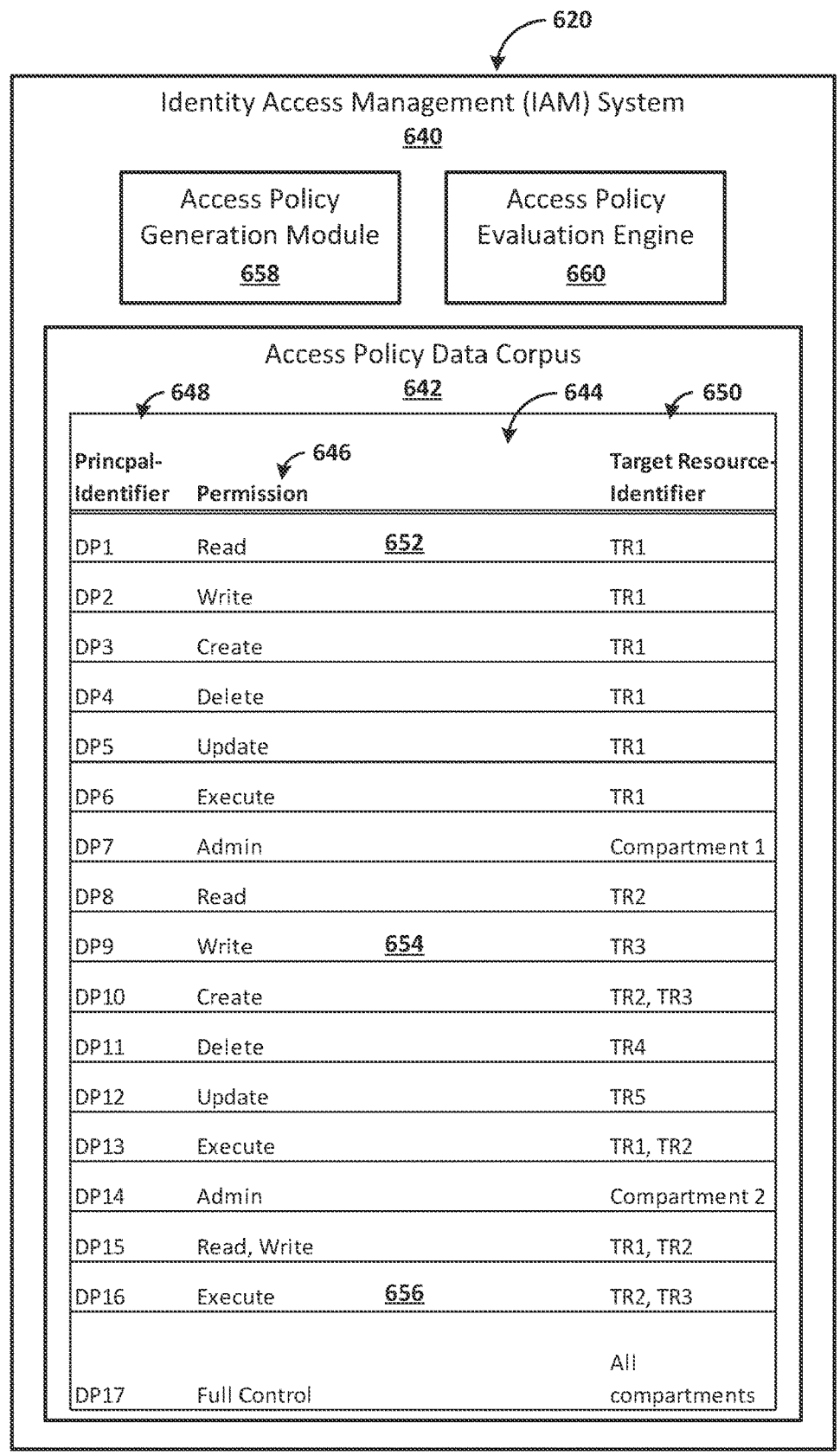

FIGS. 6A and 6B illustrate one example of a system 600 in accordance with one or more embodiments. The system 600 described with reference to FIGS. 6A and 6B may perform operations pertaining to surrogate access requests.

A. Example Computing Network

As shown in FIG. 6A, the system 600 may include a computing network such as a virtual cloud network 602. The virtual cloud network 602 may include one or more computing entities 604 (such as computing entity 604a and computing entity 604n). Additionally, the virtual cloud network 602 may include one or more target resources 606 (such as target resource 606a, target resource 606n, target resource 606p, and target resource 606z). In one example, the target resources 606 may include computing entities 604. In one example, a first computing entity 604 may access a second computing entity 604, and the second computing entity 604 may be a target resource 606 with respect to the first computing entity 604. Additionally, or alternatively, the second computing entity 604 may access the first computing entity 604, and the first computing entity 604 may be a target resource 606 with respect to the second computing entity 604.

The target resources 606 may be respectively located in one or more compartments 608, such as compartment 608a or compartment 608n. For example, as shown, target resource 606a and target resource 606n are located in compartment 608a. Additionally, as shown, target resource 606p and target resource 606x are located in compartment 608n. Additionally, or alternatively, one or more target resources 606 may be located outside of a compartment 608 such as in a different portion of the virtual cloud network 602. In one example, a compartment 608 may be associated with a particular tenant. Additionally, or alternatively, a compartment 608 may be associated with cloud provider. A compartment 608 that is associated with a cloud provider may encompass one or more compartments 608 respectively associated with a particular tenant. Additionally, or alternatively, a compartment 608 associated with a cloud provider and one or more compartments 608 associated with various tenants may respectively represent separate portions of the virtual cloud network 602.

In one example, one or more computing entities 604 may be located external to the virtual cloud network 602. In one example, the virtual cloud network 602 may represent a portion of a multi-could network. For example, a first virtual cloud network (e.g., virtual cloud network 602) may be associated with a first cloud provider, and a second virtual cloud network (not shown) may be associated with a second cloud provider. The first virtual cloud network (e.g., virtual cloud network 602) may include one or more target resources 606, and the second virtual cloud network (not shown) may include one or more computing entities 604 that may access the one or more target resources 606. Additionally, or alternatively, the one or more computing entities 604 may be located on an on-premises network.

The one or more computing entities 604 may include a surrogate access module 610. For example, as shown, computing entity 604a includes surrogate access module 610a. Additionally, as shown, computing entity 604n includes surrogate access module 610n. A surrogate access module 610 may execute operations associated with generating, requesting, or authorizing surrogate tokens. Additionally, or alternatively, a surrogate access module 610 may execute operations pertaining to transmitting surrogate access requests to execute a requested operation upon a target resource 606.

One or more of the computing entities 604 may hold a surrogate token 612. A surrogate token 612 may represent authorization for a computing entity 604 to execute one or more operations upon one or more target resources 606 based on an access policy corresponding to a principal associated with another computing entity 604. The one or more operations associated with a surrogate token 612 held by a computing entity 604 may represent operations that the computing entity 604 that holds the surrogate token has authorization to execute based on one or more access policies corresponding to a principal associated with the computing entity 604. Additionally, or alternatively, the principal associated with the computing entity 604 that holds the surrogate token 612 may lack any access policies. Additionally, or alternatively, the computing entity 604 that holds the surrogate token 612 may lack any principal associated with the computing entity 604. The computing entity 604 may utilize the surrogate token 612 to execute one or more operations that the computing entity 604 would be otherwise unauthorized to execute without the surrogate token 612.

A computing entity 604 may obtain and/or hold a plurality of surrogate tokens 612. Each surrogate token 612 may be associated with one or more one of the following: a particular set of one or more operations that may be executed, a particular set of one or more target resources 606, a particular set of one or more access policies, a particular principal, or a particular computing entity. A computing entity 604 may hold a different surrogate token 612 with respect to one or more of the following: different operations that may be executed, different target resources 606, different access policies, different principals, or a different computing entities 604.

In one example, a surrogate token 612 may be valid for a specified period of time and may expire after the specified period of time has elapsed. Additionally, or alternatively, a surrogate token 612 may be valid for a particular session of access to a target resource 606 and may expire upon termination of the session. Additionally, or alternatively, a computing entity 604 may obtain a new surrogate token 612 for each particular session of access to a target resource 606. In one example, a surrogate token 612 may expire at an expiry time, and a principal token 614 corresponding to a surrogate token 612 may be unexpired after the expiry time of the surrogate token 612.

In one example, as shown in FIG. 6A, computing entity 604a may hold surrogate token 612a. Surrogate token 612a may represent authorization for computing entity 604a to execute one or more operations upon one or more target resources 606, such as target resource 606a or target resource 606n. The authorization to execute the one or more operations represented by the surrogate token 612a may be based on an access policy corresponding to a principal associated with computing entity 604n. In one example, surrogate token 612a may represent authorization for computing entity 604a to execute one or more operations upon a set of target resources 606 located in a particular compartment 608 such as compartment 608a. Additionally, or alternatively, surrogate token 612a may represent a first authorization for computing entity 604a to execute a first operation with respect to a first set of one or more target resources 606 (e.g., target resources 606a and target resources 606n) and a second authorization for computing entity 604a to execute a second operation with respect to a second set of one or more target resources 606 (e.g., target resources 606p and target resources 606z). The first operation may differ from the second operation. In one example, a principal associated with surrogate token 612a may correspond to computing entity 604n. Surrogate token 612a may represent authorization for computing entity 604a to execute one or more operations upon one or more target resources 606 based on an access policy corresponding to a principal associated with computing entity 604n.

In one example, computing entity 604n may hold surrogate token 612n. Surrogate token 612n may represent authorization for computing entity 604n to execute one or more operations upon one or more target resources 606, such as target resource 606p or target resource 606z. The authorization to execute the one or more operations represented by the surrogate token 612n may be based on an access policy corresponding to a principal associated with computing entity 604a. The surrogate token may identify the requested operation. The principal token may identify the principal associated with the second computing entity. The principal may represent an identity of the second computing entity in an authorization system. In one example, computing entity 604a and computing entity 604n may utilize surrogate tokens 612 to execute operations based on one another's access policies. For example, surrogate token 612a may represent authorization for computing entity 604a to execute a first set of one or more operations that computing entity 604n is authorized to execute based on an access policy corresponding to a principal associated with computing entity 604n. Additionally, or alternatively, surrogate token 612n may represent authorization for computing entity 604n to execute a second set of one or more operations that computing entity 604a is authorized to execute based on an access policy corresponding to a principal associated with computing entity 604a.

A surrogate token 612 may include an identification of one or more operations that may be executed when utilizing the surrogate token 612. Additionally, or alternatively, the surrogate token 612 may include a digital signature generated by the computing entity 604 that grants the surrogate token 612. The digital signature included in the surrogate token 612 may be generated using a private key of an asymmetric key pair corresponding to the computing entity 604 that grants the surrogate token 612. The digital signature included in the surrogate token 612 may be validated using a public key of the asymmetric key pair corresponding to the computing entity 604 that granted the surrogate token 612. In one example, the digital signature included in the surrogate token 612 may correspond to an asymmetric key pair associated with a principal token held by the computing entity that grants the surrogate token 612. By including a digital signature corresponding to the computing entity 604 that grants the surrogate token 612, the system 600 can validate that the surrogate token 612 was authorized by the computing entity 604 that holds the private key utilized to generate the digital signature. A successful validation of the digital signature included in the surrogate token 612 may indicate that the surrogate token 612 is authorized by the computing entity 604 that holds the private key utilized to generate the digital signature.

In one example, in addition to holding a surrogate token 612, a computing entity 604 may hold a principal token 614 corresponding to the computing entity 604 that grants the surrogate token 612. The principal token 614 may identify the principal associated with the computing entity 604 that grants the surrogate token 612. In one example, the principal may represent an identity in an authorization system corresponding to the computing entity 604 that grants the surrogate token 612. In one example, the principal token 614 may include a principal-identifier that uniquely identifies the principal. The principal identified in the principal token 614 may be utilized to identify the one or more access policies corresponding to the principal associated with the computing entity 604 that grants the surrogate token 612. When a computing entity 604 grants a surrogate token 612, the computing entity may provision the computing entity 604 that holds the surrogate token 612 with both the surrogate token 612 and the principal token 614. In one example, the principal token 614 may include a public key of the asymmetric key pair corresponding to the private key utilized by the computing entity 604 that grants the surrogate token 612 to digitally sign the surrogate token 612.

In one example, as shown in FIG. 6A, computing entity 604a may hold surrogate token 612a, granted by computing entity 604n. Additionally, computing entity 604a may hold principal token 614n corresponding to computing entity 604n. Additionally, or alternatively, as further shown in FIG. 6A, computing entity 604n may hold surrogate token 612n, granted by computing entity 604a. Additionally, computing entity 604n may hold principal token 614a corresponding to computing entity 604a.

In one example, a computing entity 604 may include a key generation module 616. For example, as shown in FIG. 6A, computing entity 604a may include key generation module 616a, and computing entity 604n may include key generation module 616n. A key generation module 616 may execute operations associated with generating asymmetric key pairs for use in validating surrogate access requests. In one example, when generating a surrogate token 612, the computing entity 604 that will hold the surrogate token 612 may utilize the key generation module 616 to generate a private key and a public key. The public key may be incorporated into the surrogate token 612. The private key may be retained by the computing entity 604 that will hold the surrogate token 612 and may be utilized to digitally sign surrogate access requests.

B. Example Access Control Services and Authorization Systems

Referring further to FIG. 6A, the virtual cloud network 602 may include an access control service 618 and an authorization system 620. The computing entities 604 may access the target resources 606 via the access control service 618. Computing entities 604 that hold a surrogate token 612 may transmit surrogate access requests to the access control service 618. The access control service 618 may execute one or more security protocols for authorizing a set of computing entities 604 to access a set of target resources 606. The one or more security protocols may include operations pertaining to surrogate access requests such as validating surrogate access requests and determining whether requested operations in surrogate access requests correspond to authorized operations in access policies maintained in the authorization system 620.

The authorization system 620 may manage and store access policies associated with various principals that represent an identity of an entity that interacts with and accesses cloud resources or services. The authorization system 620 may include, for a set of one or more principals, one or more access policies associated with the identity of a particular principal. The access policies may respectively define permissions or actions that are authorized or denied, for example, with respect to a respective principal. The access policies may be associated with a set of one or more target resources 606. Additionally, or alternatively, the access policies may be associated with one or more compartments of the virtual cloud network 602 such as a compartment where a particular set of target resource 606 is located.

A surrogate access request transmitted to the access control service 618 may include a surrogate token 612 and a principal token 614. The surrogate access request may represent a request to execute one or more operations upon one or more target resources 606 based on the access policy corresponding to the principal associated with the computing entity 604 that granted the surrogate token 612. Additionally, the surrogate access request may include a digital signature generated by the computing entity 604 that holds the surrogate token 612.

The digital signature included in the surrogate access request may be generated using a private key of an asymmetric key pair corresponding to the computing entity 604 that holds the surrogate token 612. The digital signature included in the surrogate access request may be validated using a public key of the asymmetric key pair corresponding to the computing entity 604 that holds the surrogate token 612. In one example, the public key of the asymmetric key pair corresponding to the private key utilized to digitally sign the surrogate access request may be included in the surrogate token 612. By including a digital signature in the surrogate access request, the system 600 can validate that the surrogate access request was transmitted from the computing entity 604 that holds the private key utilized to generate the digital signature. Additionally, by including the corresponding public key in the surrogate token 612, the system 600 can validate that the computing entity 604 that transmitted the surrogate access request is the holder of the surrogate token 612. A successful validation of the digital signature included in the surrogate access request may indicate that the computing entity 604 making the surrogate access request holds the surrogate token 612.

Referring to FIG. 6B, an example authorization system 620 is further described. As shown in FIG. 6B, an authorization system 620 may include an IAM system 640. The IAM system 640 may include an access policy data corpus 642. The access policy data corpus 642 may store one or more access policies 644. Each access policy 644 in the access policy data corpus 642 may include one or more permissions 646. The one or more permissions 646 may respectively identify characteristics and/or conditions of access to one or more target resources and/or compartments. In one example, the one or more permissions 646 may include at least one action permission. An action permission may identify one or more types of access that are allowed or denied. An action permission may include at least one of the following: read, write, create, delete, update, or execute. In one example, the one or more permissions may include at least one temporal permission. A temporal permission may include at least one time-based condition on one or more types of access. A temporal permission may include at least one of the following: scheduled, session-based, time-duration, or expiry date-limited. A schedule permission may allow access according to a schedule. A session-based permission may allow access during a particular session such as a current session. A time-duration permission may allow access for a specified duration of time. An expiry date-permission may allow access until an expiry date.

Each access policy 644 may include at least one principal-identifier 648. A principal-identifier 648 may associate one or more principals with the access policy 644. Each access policy 644 may further include at least one target resource-identifier 650. A target resource-identifier 650 may associate one or more target resources with the access policy 644. In one example, an access policy 644 may include at least one permission 646, at least one principal-identifier 648, and at least one target resource-identifier 650. An access policy 644 may indicate that a principal, identified by a principal-identifier 648, has at least one permission 646 that defines one or more characteristics or conditions of access to at least one target resource, identified by a target resource-identifier 650.

In one example, as shown in FIG. 6B, a first access policy 652 may provide a first principal, identified by principal-identifier "DP1," with "Read" access to a first target resource, identified by target resource-identifier "TR1." Additionally, or alternatively, a second access policy 654 may provide a second principal, identified by principal-identifier "DP9," with "Write" access to a set of one or more target resources located within a compartment, identified by target resource-identifier "Compartment 1." Additionally, or alternatively, a third access policy 656 may provide a third principal, identified by principal-identifier "DP16," with "Execute" access to execute operations on a second target resource, identified by target resource-identifier "TR2," and a third target resource, identified by target resource-identifier "TR3."

Referring further to FIG. 6B, an IAM system 634 may include an access policy generation module 658 and/or an access policy evaluation engine 660. The access policy generation module 658 may perform operations associated with generating access policies 644. In one example, the access policy generation module 658 may generate, modify, or delete access policies 644 in the access policy data corpus 642. The access policy evaluation engine 660 may determine whether the access policy data corpus 642 includes an access policy 644 corresponding to the characteristics and/or conditions of access to a target resource that is being requested by a computing entity.

In one example, the access policy evaluation engine 660 may receive a query from the access control service 618 (FIG. 6A). The access control service 618 may transmit the query to the access policy evaluation engine 660 in response to a surrogate access request from a computing entity. The query may include an identification of a principal corresponding to a principal token included in the surrogate access request. The access policy evaluation engine 660 may obtain information from the access policy data corpus 642 corresponding to a principal identified by a principal token associated with a surrogate access request and may transmit the information to the access control service 618. The access control service 618 may compare one or more requested operations identified by a surrogate token associated with the surrogate access request to information received from the access policy evaluation engine 660 in response to the query. The access control service 618 may determine whether the one or more requested operations correspond to at least one authorized operation in the information received from the access policy evaluation engine 660. Additionally, or alternatively, the access policy evaluation engine 660 may perform the comparison of the one or more requested operations to the information from the access policy data corpus 642.

Referring again to FIG. 6A, the system 600 may include a plurality of computing entities 670. The plurality of computing entities 670 may include a plurality of target resources 606. The computing entities 670 may be located throughout one or more virtual cloud networks 602. A computing entity 670 may reside on a substrate network, an overlay network, or a network interface. A computing entity 670 may be implemented in hardware and/or software. A computing entity may include a node, a host, an agent, a service, a component, an endpoint, or other element. The plurality of computing entities 670 may include one or more substrate entities, one or more interface entities, and/or one or more overlay entities.

As used herein, the term "substrate entity" refers to a computing entity 670 implemented in a substrate network. As used herein, the term "substrate network" refers to a physical network infrastructure. The substrate network provides a foundation of a virtual cloud network. The substrate network may include physical network devices, such as routers, switches, network links, and other networking components. The substrate network may provide the basic connectivity and transport capabilities necessary for data transmission within and between data centers.

The one or more substrate entities may include substrate hosts, routers, firewalls appliances, load balancers, storage devices, and/or substrate services. A substrate host may include an endpoint within the substrate network, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software. In one example, the one or more substrate entities may include one or more substrate hosts and/or one or more substrate services. In one example, a substrate host may include a bare metal host. In one example, a substrate service may include a firmware service. The substrate entities may communicate with one another, and/or with other computing entities 670, using logical network addresses assigned within the overlay network.

As used herein, the term "network interface" refers to a communication interface between a substrate network and an overlay network, such as a network interface card, a smartNIC, or the like. A network interface may include one or more interface entities, such as a node on the network interface, or an interface service executing or executable on the network interface. A node on the network interface may include a programmable hardware component, a memory component, or a gateway component. In one example, a network interface may include a network interface card such as a smartNIC. Additionally, or alternatively, a network interface may include a node or an endpoint on a network interface card or smartNIC.

A gateway component may provide connectivity between the substrate network and the network interface and/or between the network interface and the overlay network. For example, a gateway component may enable communication between overlay entities and substrate entities. Additionally, or alternatively, a gateway component may provide connectivity between the overlay network and external networks, such as the internet or other networks outside the overlay network. For example, an overlay gateway may enable communication between overlay entities and external endpoints.

As used herein, the term "overlay network" refers to a virtual network built on a substrate network using software-defined networking (SDN), virtualization, tunneling, and/or encapsulation technologies. An overlay network may operate independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a computing entity implemented on an overlay network. The overlay network may include a plurality of overlay entities. The plurality of overlay entities may include overlay hosts, overlay services, subnets, overlay controllers, and/or overlay clients. In one example, the overlay network may include a plurality of overlay entities. In one example, an overlay entity may include an overlay host. Additionally, or alternatively, an overlay entity may include an overlay service. The plurality of overlay entities may communicate with one another using logical network addresses assigned within the overlay network.

An overlay host may include an endpoint within the overlay network, such as a virtual machine, a container, or a physical server. An overlay service may include a service executing or executable on an overlay entity. An overlay service may include a client-specific service such as a service installed by a client. Additionally, or alternatively, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, computing entities on the overlay network, and/or network policies within the overlay. An overlay controller interacts with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts that act as consumers or clients of those resources or services.

The plurality of computing entities 670 may include a plurality of data repositories. Each of the data repositories may include any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. The data repositories may share one or more storage units with one another. Additionally, or alternatively, the data repositories may include one or more storage units that differ from one another. Further, one or more of the data repositories may be implemented or executed on the same computing system as virtual cloud network 602. Additionally, or alternatively, one or more of the data repositories may be implemented or executed on a computing system separate from virtual cloud network 602.

In one or more embodiments, the system 600 may include more or fewer components than the components illustrated in FIGS. 6A and 6B. The components illustrated in FIGS. 6A and 6B may be local to or remote from each other. The components illustrated in FIGS. 6A and 6B may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. EXAMPLE SURROGATE ACCESS REQUESTS

Figure 7A:
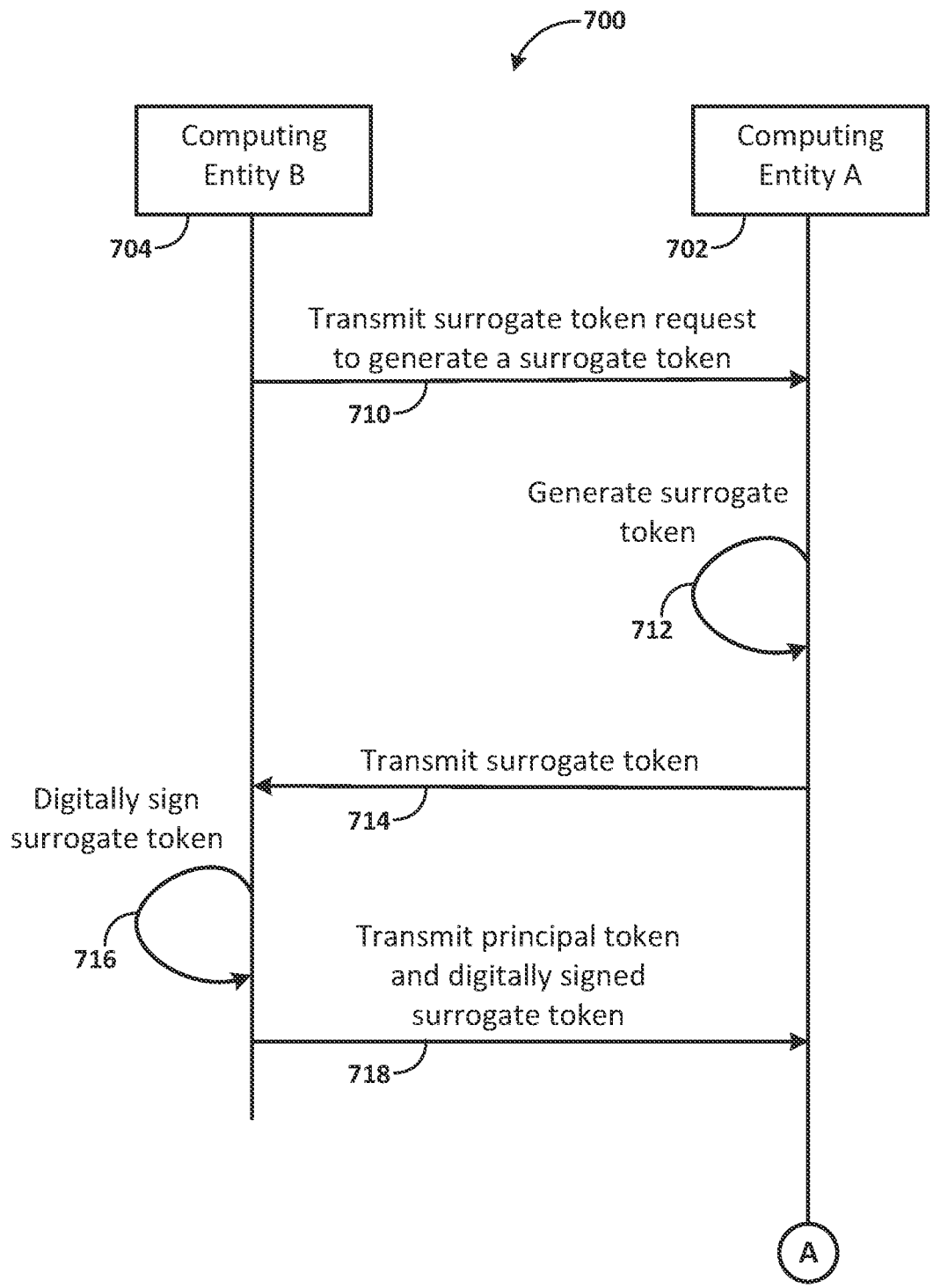
FIGS. 7A and 7B show a diagram that illustrates example operations pertaining to surrogate access requests.
Figure 7B:
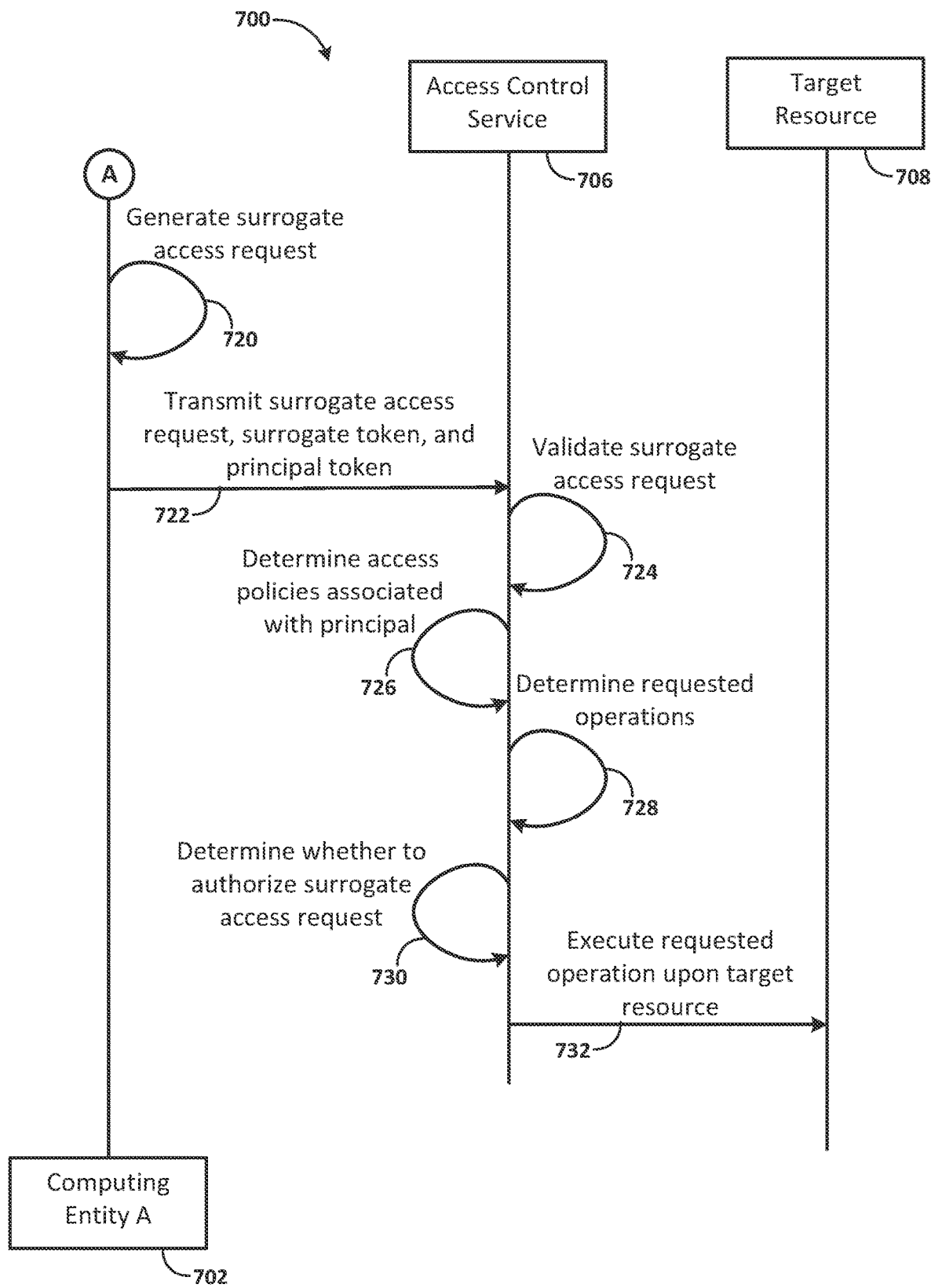

Referring to FIGS. 7A and 7B example operations 700 pertaining to surrogate access requests are further described. One or more operations 700 described with reference to in FIGS. 7A and 7B may be modified, combined, rearranged, or omitted. Accordingly, the particular sequence of operations 700 described with reference to FIGS. 7A and 7B should not be construed as limiting the scope of one or more embodiments. In one example, the operations 700 may be performed by the one or more components of the system described with reference to FIGS. 6A and 6B. The operations 700 described with reference to FIG. 7A include operations pertaining to provisioning a first computing entity 702 (Computing Entity A) with a surrogate token that represents approval by a second computing entity 704 (Computing Entity B) for the first computing entity 702 to execute a requested operation upon a target resource based on an access policy corresponding to a principal associated with the second computing entity 704. The operations described with reference to FIG. 7B include operations pertaining to surrogate access requests for an access control service 706 to execute a requested operation upon a target resource 708. The surrogate access requests may be transmitted to the access control service 706 by the first computing entity 702. The access control service may authorize and execute a requested operation upon the target resource 708, in accordance with the surrogate access request, based on an access policy corresponding to a principal associated with the second computing entity 704. The access control service 706 may represent a component that is separate from the target resource 708 or the access control service 706 may represent a component of the target resource 708. In one example, the first computing entity 702 may be a customer of the second computing entity 704. Additionally, or alternatively, the first computing entity 702 may represent a user profile associated with the customer of the second computing entity 704.

A. Generating Surrogate Tokens

As shown in FIG. 7A, a first computing entity 702 may receive a surrogate token request (operation 710). The surrogate token request may be transmitted to the first computing entity 702 from a second computing entity 704. The surrogate token request may include a request to generate a surrogate token. The surrogate token request may represent a request by the second computing entity 704 for the first computing entity 702 to execute one or more operations identified in the surrogate token based on an access policy corresponding to a principal associated with second computing entity 704. In one example, the surrogate token request may represent a request for the first computing entity 702 to execute one or more operations on behalf of the second computing entity 704. In response to receiving the request to generate the surrogate token, the first computing entity 702 may generate a surrogate token (operation 712) and may transmit the surrogate token to the second computing entity 704 (operation 714). The second computing entity 704 may receive the surrogate token from the first computing entity 702, and the second computing entity 704 may digitally sign the surrogate token (operation 716). Upon having digitally signed the surrogate token, the second computing entity may transmit a principal token, along with the digitally signed surrogate token, to the first computing entity (operation 718).

In addition, or in the alternative, to the surrogate token being generated by the first computing entity 702 in response to receiving the surrogate token request at operation 710, the first computing entity 702 may initiate the surrogate token generation process. In one example, the first computing entity 702 may initiate the surrogate token generation process by generating a surrogate token (operation 712) and transmitting the surrogate token to the second computing entity 704 (operation 714). The second computing entity 704 may receive the surrogate token from the first computing entity 702. The transmission of the surrogate token from the first computing entity 702 to the second computing entity 704 may include or represent a request from the first computing entity 702 for authorization from the second computing entity 704 for the first computing entity 702 to execute the requested operation identified by the surrogate token.

In one example, transmission of the digitally signed surrogate token and the principal token from the second computing entity 704 to the first computing entity 702 at operation 718 may include or represent an authorization by the second computing entity 704 for the first computing entity 702 to execute the one or more operations identified in the surrogate token. In one example, upon receipt of the surrogate token from the first computing entity, the second computing entity 704 may determine whether or not to authorize the first computing entity 702 to execute the one or more operations identified in the surrogate token. The first computing entity may include a credential with the surrogate token for purposes of authenticating the first computing entity and/or use by the second computing entity 704 to determine whether or not to authorize the first computing entity 702 to execute the one or more operations identified in the surrogate token. In one example, the second computing entity 704 may authorize the first computing entity 702 to execute the one or more operations identified in the surrogate token based on predetermined criteria. Additionally, or alternatively, the first computing entity 702 may be pre-authorized to execute the one or more operations identified in the surrogate token. The pre-authorization may be identified in a preauthorization table. Additionally, or alternatively, the second computing entity 704 may authorize the first computing entity 702 to execute the one or more operations identified in the surrogate token based on a user input from a user input device.

The first computing entity may generate the surrogate token utilizing a cryptographic algorithm. The surrogate token generated by the first computing entity 702 at operation 712 may include an identification of one or more operations to be executed by the first computing entity 702 and a first public key of a first asymmetric key pair corresponding to the first computing entity 702. The first computing entity 702 may retain the first private key corresponding to the first asymmetric key pair. In one example, the first computing entity 702 may generate the first asymmetric key pair contemporaneously with generation of the surrogate token at operation 712.

The second computing entity 704 may digitally sign the surrogate token with a second private key corresponding to an asymmetric key pair associated with the second computing entity 704. In one example, a second public key corresponding to the second asymmetric key pair may be included in the principal token transmitted to the first computing entity 702 at operation 718. The second computing entity 704 may retain the second private key corresponding to the second asymmetric key pair. The principal token may have been previously issued to the second computing entity 704 by the authorization system 620 (FIG. 7A). The principal token may be digitally signed by a third private key of a third asymmetric key pair associated with the authorization system 620. A third public key of the third asymmetric key pair associated with the authorization system 620 may be available to computing entities associated with the virtual cloud network.

In one example, the second computing entity 704 may generate the surrogate token at operation 716. The first computing entity 702 may generate the first asymmetric key pair at operation 712 and may transmit the first public key to the second computing entity at operation 714. The second computing entity 704 may receive the first public key from the first computing entity 702. The second computing entity 704 may generate the surrogate token utilizing a cryptographic algorithm. The surrogate token generated by the second computing entity 704 at operation 716 may include an identification of one or more operations to be executed by the first computing entity 702 and the first public key. The one or more operations to be executed by the first computing entity 702 may be determined by the second computing entity 704 when generating the surrogate token at operation 716, or the one or more operations may be transmitted from the first computing entity 702 to the second computing entity at operation 714. The second computing entity 704 may digitally sign the surrogate token with the second private key corresponding to the asymmetric key pair associated with the second computing entity 704.

B. Generating Surrogate Access Requests

Referring to FIG. 7B, operations pertaining to surrogate access requests are further described. As shown in FIG. 7B, when the first computing entity 702 receives the digitally signed surrogate token and the principal token from the second computing entity 704, the computing entity may generate a surrogate access request (operation 720) and may transmit the surrogate access request to the access control service 706 (operation 722). The surrogate access request may include the surrogate token (digitally signed by the second computing entity), the principal token, and a digital signature generated by the first computing entity 702. The first computing entity 702 may digitally sign the surrogate access request using the first private key of the first asymmetric key pair corresponding to the public key included in the surrogate token.

The access control service 706 may receive the surrogate access request from the first computing entity 702. The access control service 706 may validate the surrogate access request (operation 724). Validation of the surrogate access request may include authenticating the first computing entity 702, authenticating the surrogate token, and authenticating the principal token. The first computing entity 702 may be authenticated by validating the digital signature of the surrogate access request generated by the first computing entity 702 against the first public key included in the surrogate token. The surrogate token may be authenticated by validating the digital signature of the surrogate token generated by the second computing entity 704 against the second public key included in the principal token. The principal token may be authenticated by validating the digital signature of the principal token generated the authorization system 620 (FIG. 6A) against the third public key associated with the authorization system 620.

Upon successfully validating the surrogate access request at operation 724, the access control service 706 may determine a set of one or more access policies associated with the principal identified by the principal token (operation 726). In one example, the principal token may include a principal-identifier that identifies the principal associated with the second computing entity 704. The access control service 706 may utilize the principal-identifier to identify one or more access policies in the authorization system 620. In one example, the access control service 706 may transmit a query to the authorization system 620 such as to an access policy evaluation engine 660 (FIG. 6B) associated with the authorization system 620. The query may include the principal-identifier. The authorization system 620, such as to an access policy evaluation engine 660, may identify the set of one or more access policies associated with the principal-identifier from an access policy data corpus 642 (FIG. 6B). The authorization system 620 may transmit the set of one or more access policies associated with the principal-identifier to the access control service 706. The access control service 706 may receive the set of one or more access policies associated with the principal-identifier from the authorization system 620.

Additionally, the access control service 706 may determine one or more requested operations associated with the surrogate access request (operation 728). The requested operations may be identified in the surrogate token. In one example, the surrogate token may include one or more requested operation-identifiers that respectively identify a requested operation. Upon having determined the set of one or more access policies associated with the principal identified by the principal token and the set of one or more requested operations identified by the surrogate token, the access control service 706 may determine whether or not to authorize the surrogate access request (operation 730).

The access control service 706 may determine whether or not to authorize the surrogate access request at operation 730 by comparing the set of one or more requested operations identified by the surrogate token to the set of one or more access policies associated with the principal identified by the principal token. In one example, the access control service 706 may compare a requested operation-identifier to the set of one authorized operation-identifiers, and if the requested operation-identifier matches one of the authorized operation-identifiers, the access control service 706 may authorize the requested operation corresponding to the requested operation. Additionally, or alternatively, if a requested operation-identifier does not match one of the authorized operation-identifiers, the access control service 706 may reject the surrogate access request. When the access control service 706 rejects a surrogate access request, the access control service 706 may transmit a rejection notification to first the computing entity 702.

Upon having authorized a requested operation corresponding to the surrogate access request form the first computing entity 702, the access control service 706 may execute the requested operation upon the target resource 708 (operation 732), for example, on behalf of the first computing entity 702. Additionally, or alternatively, the access control service 706 may transmit a surrogate access approval notification to the first computing entity 702. In one example, the surrogate access approval notification may include an authorization token that may be utilized by the first computing entity 702 to access the target resource 708. Additionally, or alternatively, the first computing entity may utilize the surrogate token to access the target resource 708, for example, upon having received the surrogate access approval notification. When accessing the target resource 708, the first computing entity 702 may transmit surrogate operations requested to be executed upon the target resource 708 to the access control service 706, and the access control service 706 may execute the surrogate operations. Additionally, or alternatively, the access control service 706 may retrieve data from the target resource 708 and/or may transmit data obtained from the target resource 708 to the first computing entity 702 in connection with executing the surrogate operations. Additionally, or alternatively, once authorized, the computing entity 702 may execute surrogate operations upon the target resource 708 directly, for example, without utilizing the access control service 706 as an intermediary. Additionally, or alternatively, once authorized, the computing entity 702 and the target resource 708 may exchange data directly with one another, for example, without utilizing the access control service 706 as an intermediary.

C. Authorizing and Executing Operations Based on Surrogate Access Requests

Figure 8:
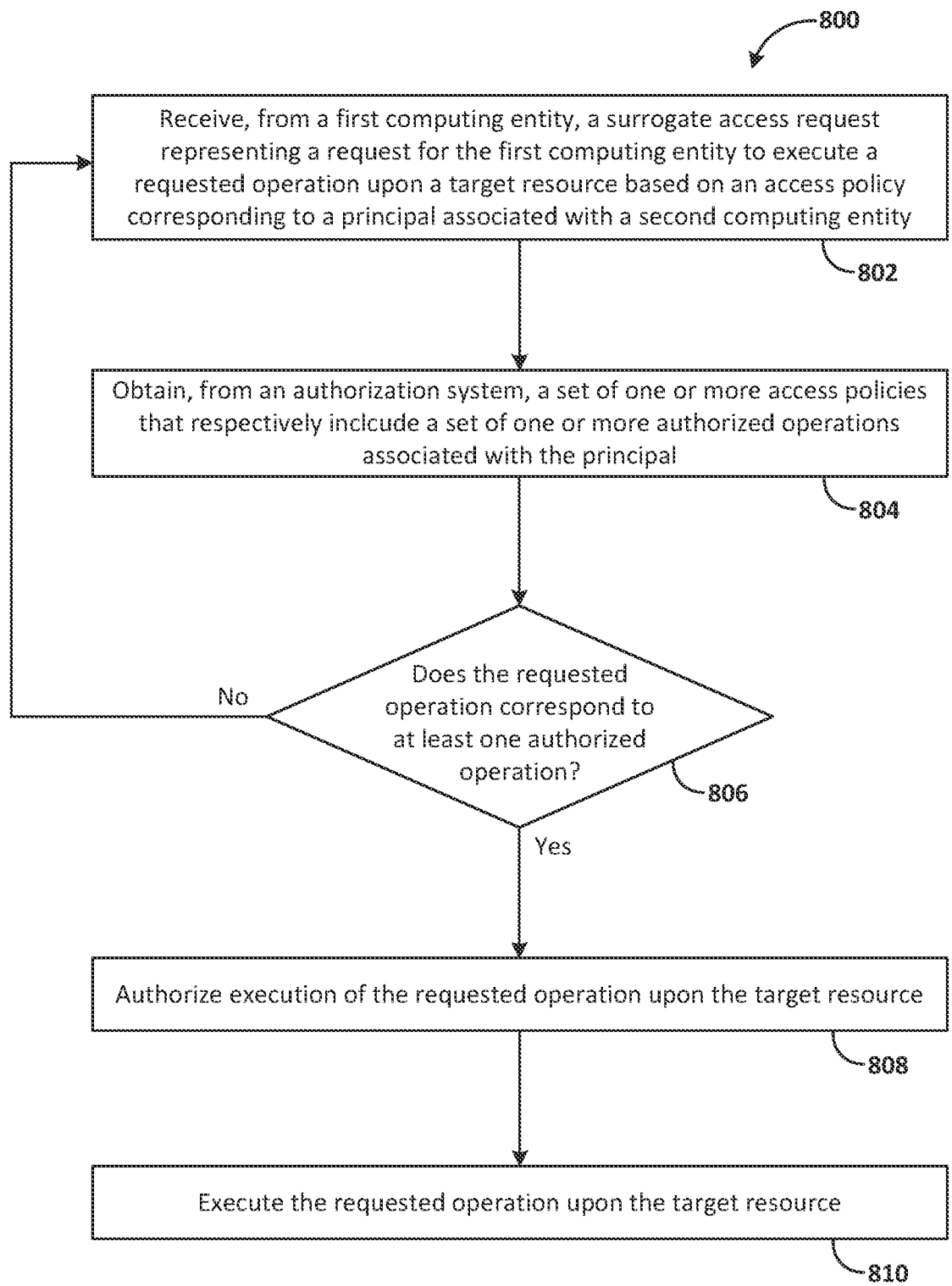
FIG. 8 is a flowchart that illustrates further example operations pertaining to surrogate access requests.

Referring to FIG. 8, example operations pertaining to surrogate access requests are further described. The operations described with reference to FIG. 8 include operations pertaining to determining whether a requested operation in a surrogate access request from a first computing entity corresponds to an authorized operation in an access policy that corresponds to a principal associated with a second computing entity. One or more operations 800 described with reference to in FIG. 8 may be modified, combined, rearranged, or omitted. Accordingly, the particular sequence of operations 800 described with reference to FIG. 8 should not be construed as limiting the scope of one or more embodiments. In one example, the operations described with reference to FIG. 8 may include one or more operations 700 described with reference to FIG. 7A or 7B. In one example, the operations 800 may be performed by the one or more components of the system described with reference to FIG. 6A or 6B.

As shown in FIG. 8, the operations 800 may include, at block 802, receiving a surrogate access request from a first computing entity. The surrogate access request may represent a request for the first computing entity to execute a requested operation upon a target resource based on an access policy corresponding to a principal associated with a second computing entity. The first computing entity may transmit the surrogate access request to an access control service. The access control service may determine whether the operation that the first computing entity is requesting in the surrogate access request corresponds to an authorized operation in an access policy that corresponds to a principal associated with the second computing entity. The surrogate access request may include a surrogate token and a principal token. The surrogate token may identify the requested operation. The principal token may identify the principal associated with the second computing entity. The principal may represent an identity of the second computing entity in an authorization system.

At block 804, the operations 800 may include obtaining a set of one or more access policies from an authorization system. The one or more access policies may respectively include a set of one or more authorized operations associated with the principal. At block 806, the operations 800 may include determining whether the requested operation corresponds to at least one authorized operation. When the operation requested in the surrogate access request corresponds to an authorized operation, the operations 800 may proceed to block 808. When the operation requested in the surrogate access request does not correspond to an authorized operation, surrogate access request may be rejected, and the operations 800 may return to block 802. In one example, when a surrogate access request is rejected, the operations 800 may include transmitting a rejection notification to the first computing entity.

At block 808, the operations 800 may include authorizing execution of the requested operation upon the target resource. In one example, upon having authorized the requested operation, the operations 800 may include, at block 810, executing the requested operation upon the target resource. Additionally, or alternatively, the operations may include transmitting an authorization notification to the first computing entity. In one example, the access control service may execute the requested operation upon the target resource. Additionally, or alternatively, the first computing entity may execute the requested operation upon the target resources, for example, upon receiving the authorization notification.

In one example, the operations 800 may include determining that a first requested operation associated with a first surrogate access request corresponds to a first authorized operation according to a first access policy. Responsive to determining that the first requested operation corresponds to the first authorized operation, the operations 800 may include authorizing execution of the first requested operation upon a first target resource. In one example, the first requested operation may represent a subset of the set of one or more authorized operations corresponding to the first access policy. Additionally, or alternatively, the operations 800 may include determining that a second requested operation associated with a second surrogate access request corresponds to a second authorized operation according to a second access policy. Responsive to determining that the second requested operation corresponds to the second authorized operation, the operations 800 may include authorizing execution of the second requested operation upon a second target resource. In one example, the second requested operation may represent a subset of the set of one or more authorized operations corresponding to the second access policy. The second authorized operation may differ from the first authorized operation. Additionally, or alternatively, the second target resource may differ from the first target resource.

In one example, the authorization system may include a first set of one or more access policies associated with a first compartment of a virtual cloud network and a second set of one or more access policies associated with a second compartment of the virtual cloud network. The first set of one or more access policies may include a first authorization for the first computing entity to perform the first authorized operation with respect to the first compartment. In one example, the first computing entity may be unauthorized to perform the first authorized operation with respect to the second compartment. Additionally, or alternatively, the second computing entity may be authorized to execute the first authorized operation with respect to the second compartment based on the second set of one or more access policies. The first computing entity may utilize a first surrogate access request to execute the first authorized operation with respect to the second compartment based on the second set of one or more access policies corresponding to a principal associated with the second computing entity.

In one example, the second set of one or more access policies may include a second authorization for the second computing entity to perform the second authorized operation with respect to the second compartment. In one example, the second computing entity may be unauthorized to perform the second authorized operation with respect to the first compartment. Additionally, or alternatively, the first computing entity may be authorized to execute the second authorized operation with respect to the first compartment based on the first set of one or more access policies. The second computing entity may utilize a second surrogate access request to execute the second authorized operation with respect to the first compartment based on the first set of one or more access policies corresponding to a principal associated with the first computing entity.

8. MISCELLANEOUS; EXTENSIONS

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application in the specific form that such claims issue, including any subsequent correction.

References, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media storing instructions that, when executed by one or more hardware processors, cause performance of operations comprising:
   receiving, from a first computing entity, a surrogate access request,
      wherein the surrogate access request represents a request for the first computing entity to execute a requested operation upon a first target resource based on a first access policy corresponding to a principal associated with a second computing entity,
      wherein the surrogate access request comprises a surrogate token and a principal token;
         wherein the surrogate token identifies the requested operation, and
         wherein the principal token identifies the principal associated with the second computing entity,
            wherein the principal represents an identity of the second computing entity in an authorization system, and
   obtaining, from the authorization system, a set of one or more access policies associated with the principal,
      wherein each access policy, of the set of one or more access policies, comprises a set of one or more authorized operations;
   determining, based at least in part on the set of one or more access policies, that the requested operation corresponds to at least a first authorized operation, of the set of one or more authorized operations corresponding to the first access policy;
   responsive to determining that the requested operation corresponds to at least the first authorized operation, authorizing execution of the requested operation upon the first target resource.

2. The one or more non-transitory computer-readable media of claim 1, wherein the requested operation represents a subset of the set of one or more authorized operations corresponding to the first access policy.

3. The one or more non-transitory computer-readable media of claim 1,
   wherein the surrogate token expires at a first expiry time, and
   wherein the principal token is unexpired after the first expiry time.

4. The one or more non-transitory computer-readable media of claim 1, wherein the surrogate token is generated by the first computing entity.

5. The one or more non-transitory computer-readable media of claim 4, wherein subsequent to generating the surrogate token, the first computing entity transmits the surrogate token to the second computing entity, wherein the second computing entity (a) receives the surrogate token from the first computing entity, (b) digitally signs the surrogate token, and (b) transmits the surrogate token and the principal token to the first computing entity.

6. The one or more non-transitory computer-readable media of claim 4, wherein a first transmission of the surrogate token from the first computing entity to the second computing entity comprises or represents the first computing entity requesting an authorization from the second computing entity for the first computing entity to execute the requested operation;

wherein a second transmission of the surrogate token and the principal token from the second computing entity to the first computing entity comprises or represents the authorization by the second computing entity for the first computing entity to execute the requested operation.

7. The one or more non-transitory computer-readable media of claim 4, wherein the surrogate token is generated by the first computing entity in response to the second computing entity requesting for the first computing entity to execute the requested operation.

8. The one or more non-transitory computer-readable media of claim 1, wherein the operations further comprise:
validating the surrogate access request, wherein validating the surrogate access request comprises:
authenticating the first computing entity;
authenticating the surrogate token; and
authenticating the principal token.

9. The one or more non-transitory computer-readable media of claim 8,
wherein the surrogate access request further comprises:
a first digital signature generated by the first computing entity using a first private key of a first asymmetric key pair corresponding to the first computing entity;
wherein the surrogate token comprises:
a first public key of the first asymmetric key pair;
wherein authenticating the first computing entity comprises:
validating the first digital signature against the first public key.

10. The one or more non-transitory computer-readable media of claim 8,
wherein the surrogate token comprises:
a second digital signature generated by the second computing entity using a second private key of a second asymmetric key pair corresponding to the second computing entity;
wherein the principal token comprises:
a second public key of the second asymmetric key pair;
wherein authenticating the surrogate token comprises:
validating the second digital signature against the second public key.

11. The one or more non-transitory computer-readable media of claim 8,
wherein the principal token comprises:
a third digital signature generated by the authorization system using a third private key of a third asymmetric key pair corresponding to the authorization system;
wherein authenticating the principal token comprises:
validating the third digital signature against a third public key of the third asymmetric key pair.

12. The one or more non-transitory computer-readable media of claim 1,
wherein the surrogate token comprises a requested operation-identifier, wherein the requested operation-identifier identifies the requested operation;
wherein the set of one or more access policies comprises a set of one or more authorized operation-identifiers, wherein each authorized operation-identifier, of the set of one or more authorized operation-identifiers, respectively identifies at least one authorized operation, of the set of one or more authorized operations;
wherein determining that the requested operation corresponds to at least the first authorized operation comprises:
comparing the requested operation-identifier to the set of one or more authorized operation-identifiers,
determining that a first authorized operation-identifier, of the set of one or more authorized operation-identifiers, corresponds to the requested operation-identifier,
wherein the first authorized operation-identifier identifies at least the first authorized operation.

13. The one or more non-transitory computer-readable media of claim 1,
wherein the principal token comprises a principal-identifier, wherein the principal-identifier identifies the principal associated with the second computing entity;
wherein obtaining the set of one or more access policies associated with the principal comprises:
transmitting a query to the authorization system, wherein the query comprises the principal-identifier; and
receiving from the authorization system, the set of one or more access policies associated with the principal-identifier, wherein the set of one or more access policies are identifiable in the authorization system based at least in part on the principal-identifier.

14. The one or more non-transitory computer-readable media of claim 1, wherein the first computing entity is a customer of the second computing entity, or wherein the first computing entity comprises a user profile associated with the customer of the second computing entity.

15. The one or more non-transitory computer-readable media of claim 1, wherein the authorization system comprises:
a first set of one or more access policies associated with a first compartment of a virtual cloud network,
a second set of one or more access policies associated with a second compartment of the virtual cloud network,
wherein the first set of one or more access policies comprises a first authorization for the first computing entity to perform the first authorized operation with respect to the first compartment,
wherein the first computing entity is unauthorized to perform the first authorized operation with respect to the second compartment,
wherein authorizing execution of the requested operation comprises authorizing the first computing entity to execute the first authorized operation with respect to the second compartment by executing the requested operation upon the first target resource based on the first access policy associated with the second computing entity.

16. The one or more non-transitory computer-readable media of claim 15, wherein the operations further comprise:
receiving, from the second computing entity, a second surrogate access request,
wherein the second surrogate access request represents a second request for the second computing entity to execute a second requested operation upon a second target resource based on a second access policy associated with the first computing entity; and
determining, based at least in part on the second set of one or more access policies, that the second requested operation corresponds to at least a second authorized operation, of a second set of one or more authorized operations corresponding to the second access policy, of the second set of one or more access policies;

responsive to determining that the second requested operation corresponds to at least the second authorized operation, authorizing execution of the second requested operation upon the second target resource in accordance with the second access policy.

17. The one or more non-transitory computer-readable media of claim 16, wherein the second set of one or more access policies comprises a second authorization for the second computing entity to perform the second authorized operation with respect to the second compartment in accordance with the second set of one or more access policies, wherein the second computing entity is unauthorized to perform the second authorized operation with respect to the first compartment in accordance with the second set of one or more access policies, wherein authorizing execution of the second requested operation comprises authorizing the second computing entity to execute the second authorized operation with respect to the first compartment by executing the second requested operation upon the second target resource based on the second access policy associated with the first computing entity.

18. The one or more non-transitory computer-readable media of claim 1, wherein the operations further comprise:

receiving, from the first computing entity, a second surrogate access request, wherein the second surrogate access request represents a second request for the first computing entity to execute a second requested operation upon a second target resource based on a second access policy associated with the second computing entity; and determining, based at least in part on a second set of one or more access policies associated with the second computing entity, that the second requested operation corresponds to at least a second authorized operation, of a second set of one or more authorized operations corresponding to the second access policy, of the second set of one or more access policies;

responsive to determining that the second requested operation corresponds to at least the second authorized operation, authorizing execution of the second requested operation upon the second target resource in accordance with the second access policy, wherein the second authorized operation differs from the first authorized operation, or wherein the second target resource differs from the first target resource.

19. A method, comprising:

receiving, from a first computing entity, a surrogate access request, wherein the surrogate access request represents a request for the first computing entity to execute a requested operation upon a first target resource based on a first access policy corresponding to a principal associated with a second computing entity, wherein the surrogate access request comprises a surrogate token and a principal token;

wherein the surrogate token identifies the requested operation, and wherein the principal token identifies the principal associated with the second computing entity, wherein the principal represents an identity of the second computing entity in an authorization system, and obtaining, from the authorization system, a set of one or more access policies associated with the principal, wherein each access policy, of the set of one or more access policies, comprises a set of one or more authorized operations;

determining, based at least in part on the set of one or more access policies, that the requested operation corresponds to at least a first authorized operation, of the set of one or more authorized operations corresponding to the first access policy;

responsive to determining that the requested operation corresponds to at least the first authorized operation, authorizing execution of the requested operation upon the first target resource;

wherein the method is performed by at least one device including a hardware processor.

20. A system, comprising:

at least one hardware processor;

wherein the system is configured to execute operations, using the at least one hardware processor, the operations comprising:

receiving, from a first computing entity, a surrogate access request, wherein the surrogate access request represents a request for the first computing entity to execute a requested operation upon a first target resource based on a first access policy corresponding to a principal associated with a second computing entity, wherein the surrogate access request comprises a surrogate token and a principal token;

wherein the surrogate token identifies the requested operation, and wherein the principal token identifies the principal associated with the second computing entity, wherein the principal represents an identity of the second computing entity in an authorization system, and obtaining, from the authorization system, a set of one or more access policies associated with the principal, wherein each access policy, of the set of one or more access policies, comprises a set of one or more authorized operations;

determining, based at least in part on the set of one or more access policies, that the requested operation corresponds to at least a first authorized operation, of the set of one or more authorized operations corresponding to the first access policy;

responsive to determining that the requested operation corresponds to at least the first authorized operation, authorizing execution of the requested operation upon the first target resource.

\* \* \* \* \*